(12) United States Patent
Offerhaus

(10) Patent No.: US 11,506,392 B2
(45) Date of Patent: Nov. 22, 2022

(54) HEAT REFLECTIVE APPARATUS

(71) Applicant: Mike Offerhaus, Maple Ridge (CA)

(72) Inventor: Mike Offerhaus, Maple Ridge (CA)

( * ) Notice: Subject to any disclaimer, the term of this patent is extended or adjusted under 35 U.S.C. 154(b) by 0 days.

(21) Appl. No.: 16/591,908

(22) Filed: Oct. 3, 2019

(65) Prior Publication Data

US 2021/0102706 A1 Apr. 8, 2021

(51) Int. Cl.
*F24B 1/195* (2006.01)
*F24B 1/198* (2006.01)
*F24B 13/00* (2006.01)

(52) U.S. Cl.
CPC ............ *F24B 1/1957* (2013.01); *F24B 1/198* (2013.01); *F24B 13/002* (2013.01)

(58) Field of Classification Search
CPC ....................................... F24B 1/1957
USPC ................................. 126/552, 553
See application file for complete search history.

(56) References Cited

U.S. PATENT DOCUMENTS

| | | | | | |
|---|---|---|---|---|---|
| 1,315,628 | A | * | 9/1919 | Gilbert | E06B 9/01 160/229.1 |
| 2,895,717 | A | * | 7/1959 | De Falco | A47D 13/065 256/25 |
| 2,981,256 | A | * | 4/1961 | Besnah | A47C 31/00 135/93 |
| 3,994,275 | A | * | 11/1976 | Williams | F24C 15/22 126/39 M |
| 4,194,490 | A | * | 3/1980 | Crnkovic | F24B 1/1957 126/39 M |
| 4,838,525 | A | * | 6/1989 | Snow | E04H 15/003 256/26 |
| 4,886,047 | A | * | 12/1989 | Bonin | F24B 1/1957 126/552 |
| 5,214,885 | A | * | 6/1993 | Maas | E04B 2/7427 52/239 |
| 5,263,468 | A | * | 11/1993 | Powell | A61F 7/00 126/696 |
| 5,379,786 | A | * | 1/1995 | Lynam | E04H 15/003 160/135 |
| 5,469,839 | A | * | 11/1995 | Kasulis | F24B 1/1957 126/552 |
| 5,664,556 | A | * | 9/1997 | Byers | F24C 15/22 126/552 |
| 5,979,434 | A | * | 11/1999 | Bilanzich | A47C 7/66 126/552 |
| 7,011,424 | B1 | * | 3/2006 | Poulson | F24B 1/1957 362/163 |
| 8,360,049 | B2 | * | 1/2013 | Stephens | E04H 15/003 126/30 |

(Continued)

*Primary Examiner* — David J Laux

(57) ABSTRACT

A heat reflective apparatus for use on the ground adjacent to campfires. The apparatus include a plurality of separate panels. Each of the plurality of panels are configured for vertical orientation and have a top edge and an opposing bottom edge defining a height and opposing side edges defining a width. A plurality of vertically oriented hinges, with each being connected to a side edge of two adjacent panels of the plurality of panels. This allows each of the connected adjacent panels to move between a collapsed position facing the other adjacent panel and an open position in relation with the other adjacent panel. At least two of the plurality of panels have at least one ground spike secured to the bottom edges thereof. The ground spikes are configured to secure the plurality of panels to the ground.

9 Claims, 5 Drawing Sheets

(56) References Cited

U.S. PATENT DOCUMENTS

| | | | | |
|---|---|---|---|---|
| 8,800,547 B2 * | 8/2014 | Benedetti | ............... | F23D 14/70 |
| | | | | 126/552 |
| 2006/0144386 A1 * | 7/2006 | Cho | ................ | F24C 3/14 |
| | | | | 126/38 |
| 2007/0090335 A1 * | 4/2007 | Legrand | ............... | E04B 2/7405 |
| | | | | 256/24 |
| 2008/0163863 A1 * | 7/2008 | Thomas | ................ | F24C 3/022 |
| | | | | 126/512 |
| 2008/0178543 A1 * | 7/2008 | Maas | ................ | E04B 2/7425 |
| | | | | 52/234 |
| 2010/0132895 A1 * | 6/2010 | Logue | ................ | A47B 46/005 |
| | | | | 160/405 |
| 2013/0260362 A1 * | 10/2013 | Melashenko | .......... | G09B 25/00 |
| | | | | 434/430 |
| 2014/0138035 A1 * | 5/2014 | Potter | ................ | E04B 2/7427 |
| | | | | 160/135 |
| 2017/0306693 A1 * | 10/2017 | Potter | ............... | E06B 9/04 |
| 2019/0360263 A1 * | 11/2019 | Wang | ................ | E06B 9/0623 |
| 2022/0275638 A1 * | 9/2022 | Hettwer | ................ | E05D 1/02 |

* cited by examiner

US 11,506,392 B2

HEAT REFLECTIVE APPARATUS

REFERENCE TO PENDING APPLICATIONS

This application does not claim the benefit of pending application.

BACKGROUND OF THE INVENTION

1. Field of the Invention

The present invention is generally directed toward a reflective apparatus, and more specifically, toward portable heat reflective apparatus.

2. Description of the Related Art

Camping, vehicle overland travel and other outdoor activities often require the creating of a campfire. Issues however are associated with maintaining a fire in windy situations. Exposure to the wind can cause a variety of problems with starting the fire, containing the fire, maintaining the fire, and dissipating the smoke into the air.

For example, a campfire can serve several purposes, such as offering warmth and light to observers. However, one of the drawbacks of the outdoor campfire is that wind tends to blow smoke and ash into the direction of the observers, creating an uncomfortable experience.

Further, a campfire can provide heat to a camper. However, a typical campfire allows heat to radiate in all directions. This can make it difficult for the camper to absorb the heat of campfire.

Therefore, it is desirable to provide a windscreen capable of overcoming these and other drawbacks. Accordingly, there is a need for a protection/heat reflective apparatus that addresses the needs set out above.

SUMMARY OF THE INVENTION

In an aspect of the present invention, a heat reflective apparatus for use on the ground adjacent to campfires is disclosed. In this aspect, the apparatus includes a plurality of separate panels, a plurality of vertically oriented hinges, and at least one ground spike.

Each of the plurality of panels are configured for vertical orientation and have a top edge and an opposing bottom edge defining a height and opposing side edges defining a width. At least two of the plurality of panels have at least one ground spike secured to the bottom edge thereof. The ground spikes are configured to secure the plurality of panels to the ground.

Each of the plurality of vertically oriented hinges are connected to the side edge of two adjacent panels of the plurality of panels. The hinges allow each of the connected adjacent panels to move between a collapsed position facing the other adjacent panel and an open position in relation with the other adjacent panel. In some aspects, the open position is further defined as being at least 120 degrees orientation relative to the adjacent panel.

In some aspects, the plurality of panels are made from aluminum, and include four or six panels. Further, the plurality panels may be configured to substantially form a parabola when in an open position.

In some aspects, the ground spikes may be removably secured to the plurality of panels, include at least two ground spikes secured to each of at least two of the plurality of panels. Further, the ground spikes may be hingedly configured to the bottom edge of the respectively panel of the plurality of panels to allow movement from an extended position substantially perpendicular to the bottom edge and a closed position substantially parallel to the bottom edge The features of the invention which are believed to be novel are particularly pointed out in the specification. The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

The figures which accompany the written portion of this specification illustrate embodiments and method(s) of use for the present invention constructed and operative according to the teachings of the present invention.

The various embodiments of the present invention will hereinafter be described in conjunction with the appended drawings, wherein like designations denote like elements.

DETAILED DESCRIPTION

The present invention is generally directed toward a heat reflective apparatus, and more specifically, toward portable heat reflective apparatus.

Figure 1:
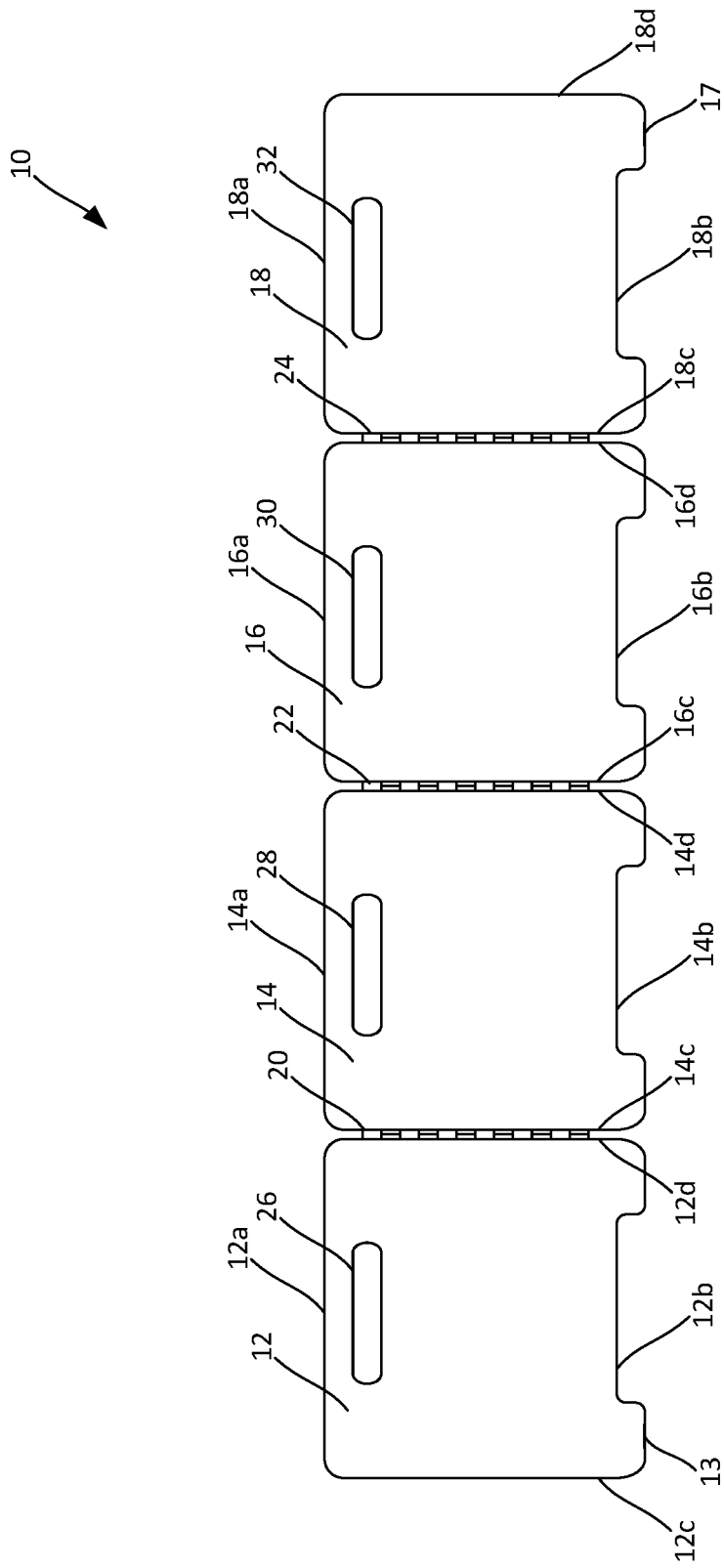
FIG. 1 is a side view of an embodiment of present invention in an open position.
Figure 2:
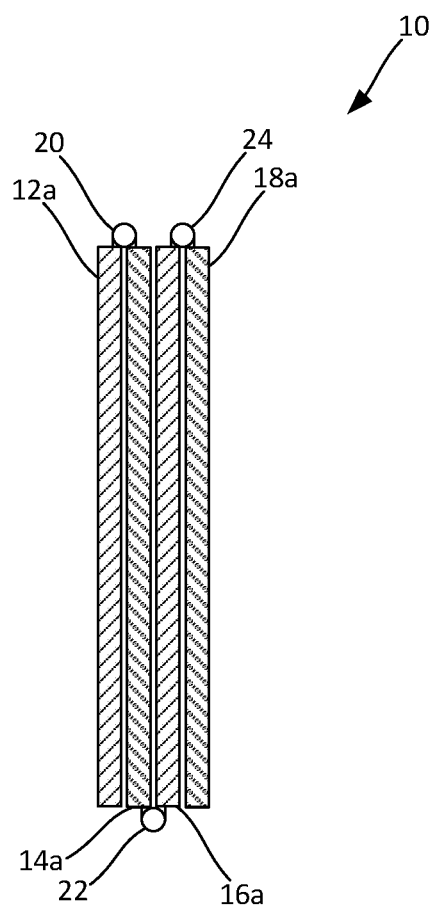
FIG. 2 is a top view of an embodiment of the present invention in a closed position.
Figure 3:
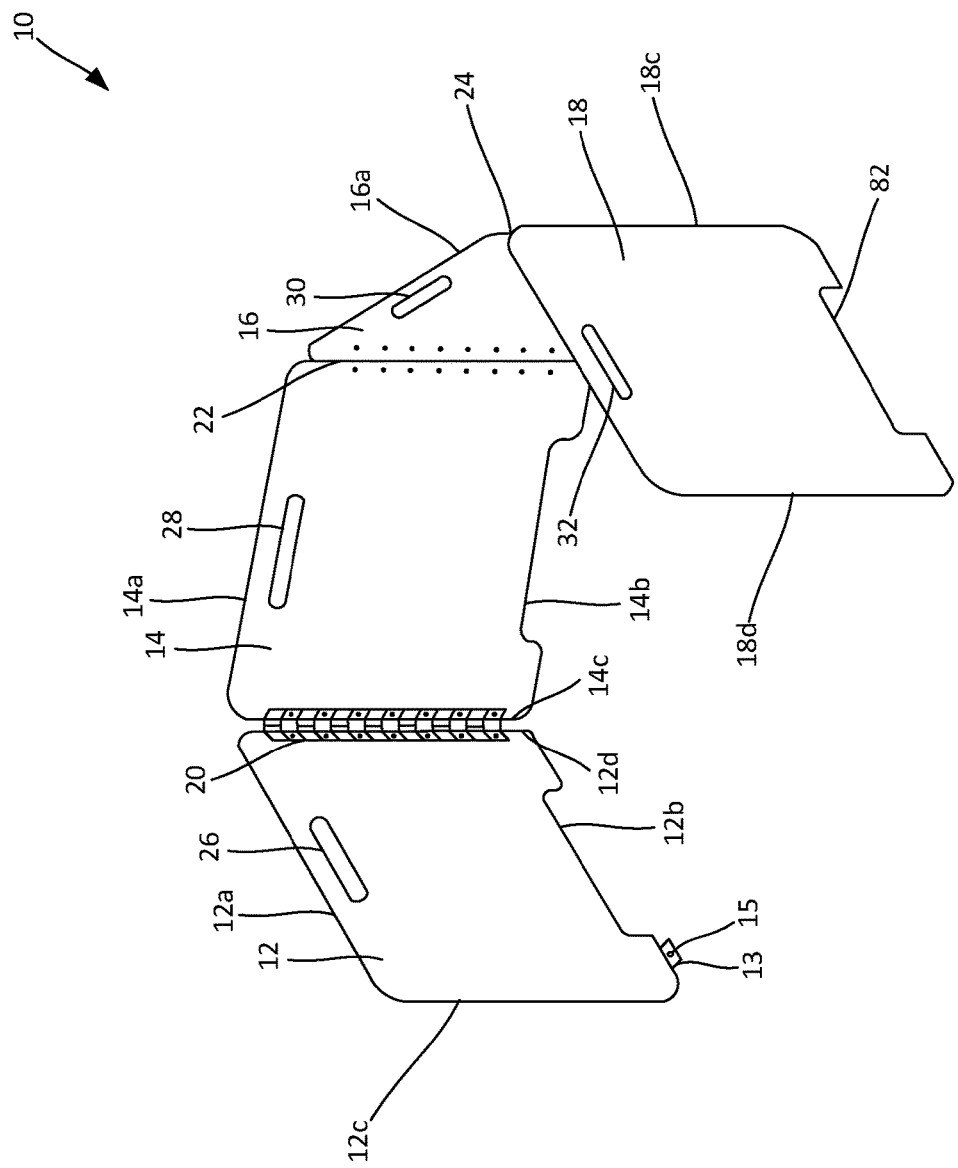
FIG. 3 is a perspective view of an embodiment of the present invention in an open position.

As illustrated in FIGS. 1-3, an embodiment of a protective apparatus 10 for use on the ground adjacent to campfires is disclosed. The apparatus 10 includes a plurality of separate panels 12, 14, 16, 18. Each of the plurality of panels is configured for a vertical orientation and has a top edge 12a, 14a, 16a, 18a and an opposing bottom edge 12b, 14b, 16b, 18b defining a height. The panels further include an opposing side edges 12c, 12d, 14c, 14d, 16c, 16d, 18c, 18d defining a width.

The apparatus 10 further includes a plurality of vertically oriented hinges 20, 22, 24. Each of the plurality of hinges are connected to a side edge of two adjacent panels. For example, hinge 20 is secured to side edge 12d of panel 12 and side edge 14c of panel 14. Each hinge allows the connected panel to move between a collapsed position facing the other adjacent panel, see FIG. 2, and an open position, see FIG. 3, in relation with the other adjacent panel.

The collapsed position can be utilized when the apparatus 10 is not in use, such as during storage or in travel. The open position can be utilized when the apparatus 10 is in use.

The panels are separately constructed from any durable, light weight material, such as aluminum. The light weight allows for the apparatus to portable. Further the material may have heat reflective and/or absorption capabilities such that heat from a campfire can be reflected and/or absorbed.

Further, the panels 12, 14, 16, 18 may be placed in an open position relative to each panel for at least 120 degrees orientation. In some embodiments, the degree of orientation may be greater, such as upwards to 180 degrees. Additionally, when placed in an open position, the apparatus may form a parabola configuration. This shape can help direct and reflect the heat from the campfire based on the principles of a parabolic arc.

As shown in FIG. 1, panels 12, 18 each have a ground tab 13, 17 having a ground spike opening 15, see FIG. 3, located along the bottom edges 12b, 18b and extending away therefrom. The ground tabs 13, 17 are designed to receive a spike, nail, peg or other securing item in order to secure the panels 12, 18 to the ground.

The number of panels as shown in FIGS. 1-3 are four. This is illustrative and not meant to be limiting. The number of panels may be as few as three and can be more than four, such as six, eight or more. Further, the apparatus is disclosed to be used with a ground based campfire. The apparatus may also be used with other fire related devices, such a camp stove placed on a table or other surface.

Figure 4:
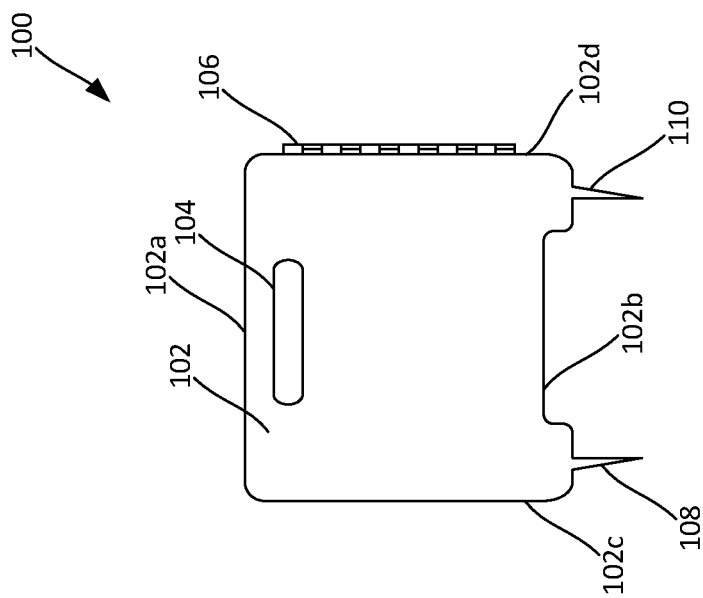
FIG. 4 is a side view of an embodiment of a panel of the present invention.
Figure 5:
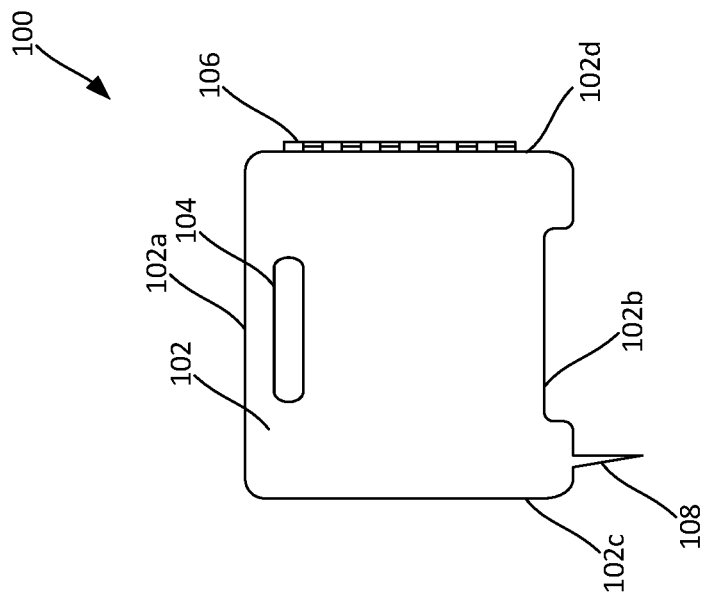
FIG. 5 is a side view of an additional embodiment of a panel of the present invention.

As illustrated in FIG. 4, in some embodiments, apparatus 100 includes a ground spike 108 being secured to the bottom edge 102b of a panel 102. The ground spike 108 is designed to secure the associated panel, and the connected panels indirectly, to the ground to prevent movement thereof. In some embodiments, a panel may have two ground spikes 108, 110, see FIG. 5. The ground spike 108 may be permanently or removably secured to the panel 102. The number of panels as shown in FIGS. 4 and 5 are one. This is illustrative and not meant to be limiting. The number of panels that may have one or more ground spikes may be two or more.

Figure 7:
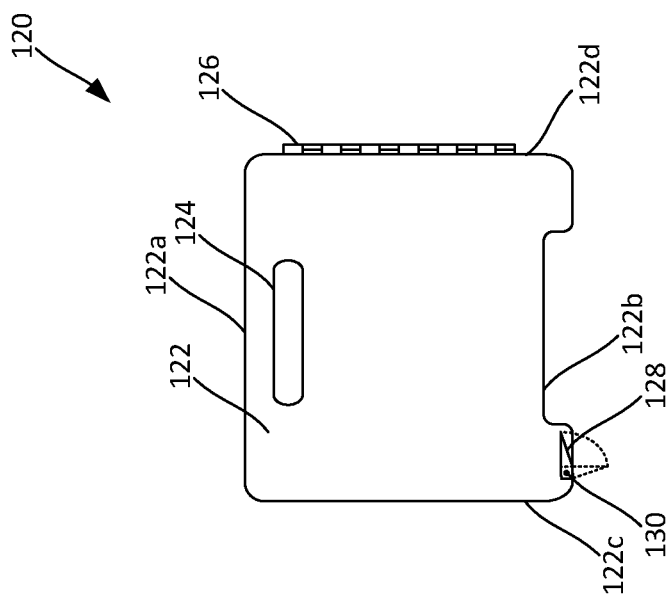
FIG. 7 is a side view of an additional embodiment of a panel of the present invention illustrating an embodiment of a ground spike in a closed position.
Figure 6:
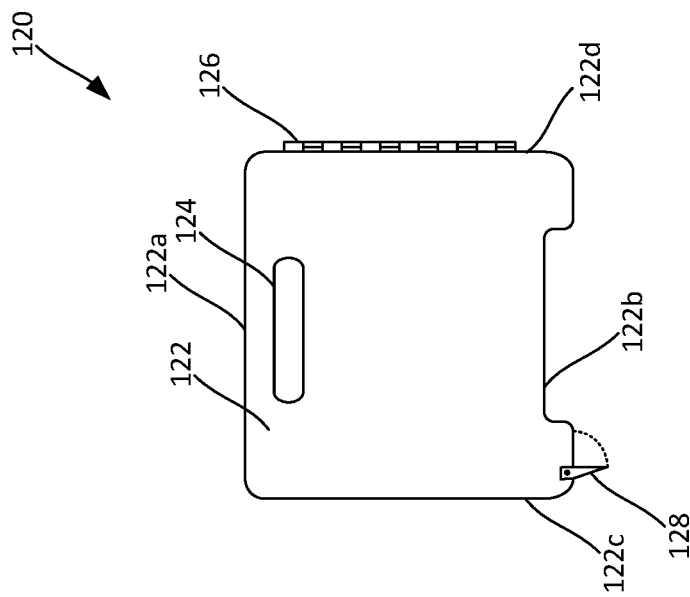
FIG. 6 is a side view of an additional embodiment of a panel of the present invention illustrating an embodiment of a ground spike in an open position.

In some embodiments, as shown in FIGS. 6 and 7, a ground spike 128 is secured to the bottom edge 122b of a panel 122 by a hinge 130. This allows ground spike 128 to be moved between an open position that can engage the ground, see FIG. 6, and a closed position, see FIG. 7, adjacent bottom edge 122b when not in use.

The exact specifications and materials used in the manufacture of the apparatus of the present invention may vary upon manufacturing.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment(s) were chosen and described in order to best explain the principles of the present invention and its practical application, to thereby enable others skilled in the art to best utilize the present invention and various embodiments with various modifications as are suited to the particular use contemplated.

I claim:

1. An apparatus for use on the ground adjacent to a campfire, the apparatus comprising:
   a plurality of separate solid panels, each of the plurality of panels configured for vertical orientation and having a top edge and an opposing bottom edge defining a height, and opposing side edges defining a width, wherein the width and height of each panel being substantially equal to the remaining panels, each of the plurality of the panels having two ground tabs located along the bottom edge and proximate one of the opposing side edges, and extending away from the bottom edge defining an opening therebetween, each of the plurality panels further having an opening which serves as a handle to carry the panels, each of the plurality of panels being made from a material having heat reflective and absorption capability;
   a plurality of vertically oriented hinges, each of the plurality of hinges being connected to a side edge of two adjacent panels of the plurality of panels and allowing each of the connected adjacent panels move between a collapsed position facing the other adjacent panel and an open position in relation with the other adjacent panel to substantially form a parabola around a campfire when in an open position.

2. The apparatus of claim 1, wherein the plurality of panels are aluminum.

3. The apparatus of claim 1, wherein the plurality of panels consists of four panels.

4. The apparatus of claim 1, wherein the plurality of panels consist of six panels.

5. The apparatus of claim 1, wherein the at least one ground spikes being removably secured to the plurality of panels.

6. The apparatus of claim 1, wherein at least two ground spikes secured to the bottom edge of at least two of the plurality of panels secure the plurality of panels to the ground.

7. The apparatus of claim 1, wherein each of the at least one ground spikes are hingedly configured to the bottom edge of the respectively panel of the plurality of panels to allow movement from an extended position substantially perpendicular to the bottom edge and a closed position substantially parallel to the bottom edge.

8. The apparatus of claim 1, further comprising at least one ground spikes secured to the bottom edge of at least two of the plurality of panels secure the plurality of panels to the ground.

9. The apparatus of claim 1, wherein at least one of two ground tabs on each of the plurality of panels comprises a ground spike opening configured to receive a ground spike.

* * * * *